United States Patent [19]

Bryant et al.

[11] Patent Number: 5,794,171
[45] Date of Patent: Aug. 11, 1998

[54] PROCESS FOR DERIVING PREDICTIVE MODEL OF CRANKSHAFT ROTATION OF A COMBUSTION ENGINE

[75] Inventors: Bruce David Bryant, Royal Oak, Mich.; Vasanth Krishnaswami, Columbus, Ohio; Kenneth Andrew Marko, Ann Arbor, Mich.

[73] Assignee: Ford Global Technologies, Inc., Dearborn, Mich.

[21] Appl. No.: 609,026

[22] Filed: Feb. 29, 1996

[51] Int. Cl.⁶ .................. G01M 15/00; G06F 17/10
[52] U.S. Cl. .................. 701/99; 701/102; 701/110; 701/111; 123/414; 123/416; 123/419
[58] Field of Search .................. 364/431.01, 431.03, 364/431.04, 431.08, 431.051, 431.07, 424.034, 424.04; 73/116, 117.3; 123/414, 416, 419, 436, 426, 428; 701/99, 101, 102, 111, 103, 110, 29, 35

[56] References Cited

U.S. PATENT DOCUMENTS

| | | | |
|---|---|---|---|
| 5,041,976 | 8/1991 | Marko et al. | 364/424.034 |
| 5,193,513 | 3/1993 | Marko et al. | 123/571 |
| 5,313,407 | 5/1994 | Tiernan et al. | 364/508 |
| 5,528,931 | 6/1996 | James et al. | 73/117.3 |
| 5,542,291 | 8/1996 | James | 364/431.08 |
| 5,587,524 | 12/1996 | Hampo et al. | 364/431.07 |

OTHER PUBLICATIONS

"Identification of a Nonlinear Mimo Internal Combustion Engine Model", by Guan–Chun Luh and Giorgio Rizzoni, DSC–vol. 54/vol. 76, Transportation Systems, ASME 1994, pp. 141–174 (month is not available).

"Input–output parametric models for non–linear systems. Part I: deterministic non–linear systems". Int.J.Control, 1985, vol. 41, No. 2, pp. 303–328 (month is not available).

"Input–output parametric models for non–linear systems. Part II: stochastic non–linear systems". Int.J.Control, 1985, vol. 41, No. 2, pp. 329–344 (month is not available).

*Primary Examiner*—Tan Q. Nguyen
*Attorney, Agent, or Firm*—Mark Mollon

[57] ABSTRACT

A predictive model is derived for subsequent use in a misfire detector in an internal combustion engine. Data collected using a test engine is curve-fitted using NARMAX techniques to obtain a computational formula for the predictive model which relates deviant acceleration at the accessible crankshaft section to deviant acceleration at the inaccessible crankshaft section. Thus, the model can be used during actual misfire detection to reduce the effects of the torsional oscillations.

6 Claims, 5 Drawing Sheets

PROCESS FOR DERIVING PREDICTIVE MODEL OF CRANKSHAFT ROTATION OF A COMBUSTION ENGINE

The present application is related to U.S. application Ser. No. 08/609,028, entitled "Misfire Detector with Torsional Oscillation Filtering", which was filed concurrently herewith.

BACKGROUND OF THE INVENTION

The present invention relates in general to misfire detection in internal combustion engines, and more specifically to a system and method that filters out irregularities in measured crankshaft acceleration introduced when measuring crankshaft rotation at a section of the crankshaft that is less damped to torsional oscillations than is another crankshaft section.

In crankshaft based misfire detection methods, the failure of one or more cylinders to produce power during its respective power stroke is detected by sensing very small changes in the velocity (and thus acceleration) of the engine crankshaft. Since the velocity during each velocity measuring interval of engine rotation is determined according to the rotational arc $\Delta\theta$ covered by the interval divided by the time $\Delta T$ required to pass through the arc, the measured values for both $\Delta\theta$ and $\Delta T$ must be measured sufficiently accurately to provide the sensitivity required to detect such small velocity changes.

Crankshaft based misfire detection methods are discussed in U.S. Pat. No. 5,044,194, U.S. Pat. No. 5,056,360, and U.S. Pat. No. 5,109,695, all hereby incorporated by reference. Such methods perform well under certain engine operating conditions. However, at certain combinations of engine speed and engine load, the accuracy of crankshaft based misfire detection methods typically decreases. For example, with an engine operating at high speed and low load, systematic irregularities in the measured crankshaft velocity interfere with reliable differentiation between misfires and proper firings of individual cylinders.

A significant source of such irregularity is the presence of position errors in determining the rotational arcs during each measuring interval. Engine rotational position is monitored using a rotor having vanes, teeth, or slots disposed thereon for interacting with magnetic or optical sensors at predetermined points in the rotation of the engine crankshaft. One source of position error results from the rotor wheel profile. During manufacture of a wheel, errors occur between the desired and actual positions for position markers on the wheel. Any deviation of the actual angle $\Delta\theta$ from the assumed value results in velocity and acceleration errors. This type of position error is discussed in U.S. Pat. No. 5,117,681, which is incorporated herein by reference.

Another source of measurement irregularity is the torsional flexing of the crankshaft during engine operation. The crankshaft is an extended shaft constructed of metal which is not completely rigid and thus flexes as it is driven by the engine cylinder firings. A crankshaft typically is connected to a flywheel of large mass near the back of an engine and extends through the front of the engine for access by auxiliary components. The torsional flexing along the crankshaft creates oscillations in the sensed crankshaft rotation intervals. These oscillations again lead to irregularities in the resulting velocities and accelerations, possibly causing inaccuracies in the misfire detection.

A method for dynamically obtaining correction factors to remove these irregularities is disclosed in copending application Ser. No. 08/417,357, "Adaptive Correction of Torsional and Wheel Profile Position Errors for Misfire Detection", now U.S. Pat. No. 5,531,108 which is incorporated herein by reference.

The signal-to-noise ratio achieved in a crankshaft-based misfire detector is related to the position along the axial length of the crankshaft where crankshaft rotation is sensed. More specifically, some sections of the crankshaft are more damped to torsional oscillations than others, such as sections having greatest mass (for example, the flywheel). Measuring rotation at the highly damped sections results in more accurate results than measuring at other crankshaft sections because the amount of correction needed is less and because the oscillations there are more periodic in nature. Thus, rotation measurements would most ideally be made at the massive flywheel or other massive section of the crankshaft to provide the greatest range of misfire detection accuracy over all speed and load conditions of the engine. However, the flywheel is typically mounted at the rear of an engine where it may be inconvenient for mounting a position sensor.

In addition to misfire detection, crankshaft position is also measured for controlling spark timing and dwell in the ignition system. A crankshaft position sensor for the ignition system is typically mounted at the front of the crankshaft which extends through the front of the engine. The front section of the crankshaft is remote from the most massive sections of the crankshaft and is thus more susceptible to torsional oscillations. Position accuracy is not nearly as critical for an ignition system as it is for a misfire detection system, so torsional oscillations are not a problem. However, it may be desirable to use a single position sensor for both ignition control and misfire detection, and a sensor location at the front of the crankshaft is desirable for its convenience and lower cost than a sensor mounted at other sections of the crankshaft.

Copending application Ser. No. 08/1417,361, entitled "Nonlinear Dynamic Transform for Correction of Crankshaft Acceleration Having Torsional Oscillations", describes how the motion of a torsionally-damped section of the crankshaft can be predicted based on measurements made at a relatively undamped section of the crankshaft.

SUMMARY OF THE INVENTION

The present invention has the advantage that torsional oscillations present in the signal from a non-ideal sensor are filtered out and an optimum misfire detection threshold is utilized.

The invention provides a vehicle having an internal combustion engine with a plurality of cylinders coupled to a crankshaft. The crankshaft has a flywheel portion to which a flywheel is mounted. Each cylinder produces respective ignition firings and misfires during operation of the engine and the engine includes a plurality of sensors for characterizing engine operating conditions at respective event times. The engine operating conditions include one or more of crankshaft position, crankshaft speed, crankshaft acceleration, mass air flow, and fuel pulse width. The invention includes modeling means coupled to the plurality of sensors for predicting a crankshaft acceleration value of the crankshaft near the flywheel portion without directly sensing motion of the flywheel portion. The modeling means also predicts an acceleration deficit that would be present near the flywheel portion assuming 1) that respective engine operating conditions are present as determined at a selected event time, and 2) that an individual misfire has occurred in a respective cylinder of the engine at the selected event time. A comparator outputs a misfire indication in response to the predicted crankshaft acceleration value and the predicted acceleration deficit.

The modeling means may be derived using NARMAX techniques and training data collected from a test engine. NARMAX techniques can provide advantages over neural network techniques in that 1) programming is simpler, 2) the NARMAX curve-fitting techniques allow any system knowledge that is possessed to be used in developing the model, 3) a more compact system model is produced which requires less computing power to implement on-board a vehicle than does a neural network or fuzzy logic based model, and 4) a systematic procedure can be used to decide on the complexity of the system model that will be used to thus allow intelligent trade-off between the conflicting demands of modeling accuracy and computational efficiency.

DETAILED DESCRIPTION OF PREFERRED EMBODIMENTS

Figure 1:
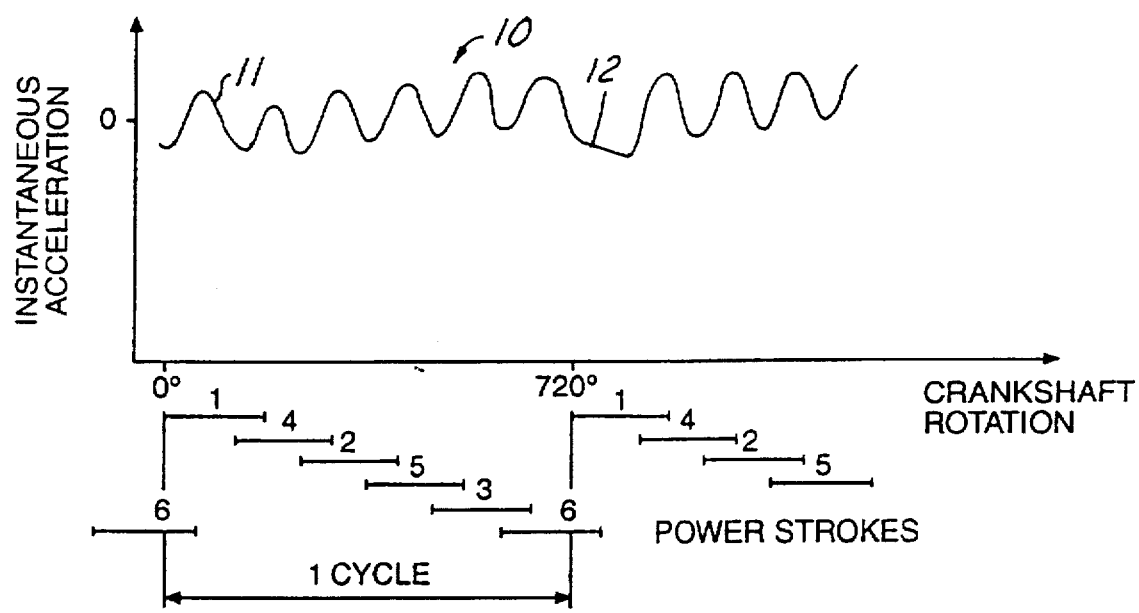
FIG. 1 is a plot showing instantaneous acceleration versus crankshaft rotation for both normal and misfiring cylinder events.

In the typical 4-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle is comprised of 720° of crankshaft rotation during which each cylinder passes through each of its four strokes.

Curve 10 in FIG. 1 shows approximate acceleration fluctuation during engine operation. An acceleration peak 11 occurs during the firing interval of cylinder No. 1 and other maximums in the acceleration curve occur approximately corresponding to each other properly firing cylinder. When a misfire occurs such that no significant power is created by a cylinder during its firing interval, the crankshaft decelerates as indicated at 12.

Figure 2:
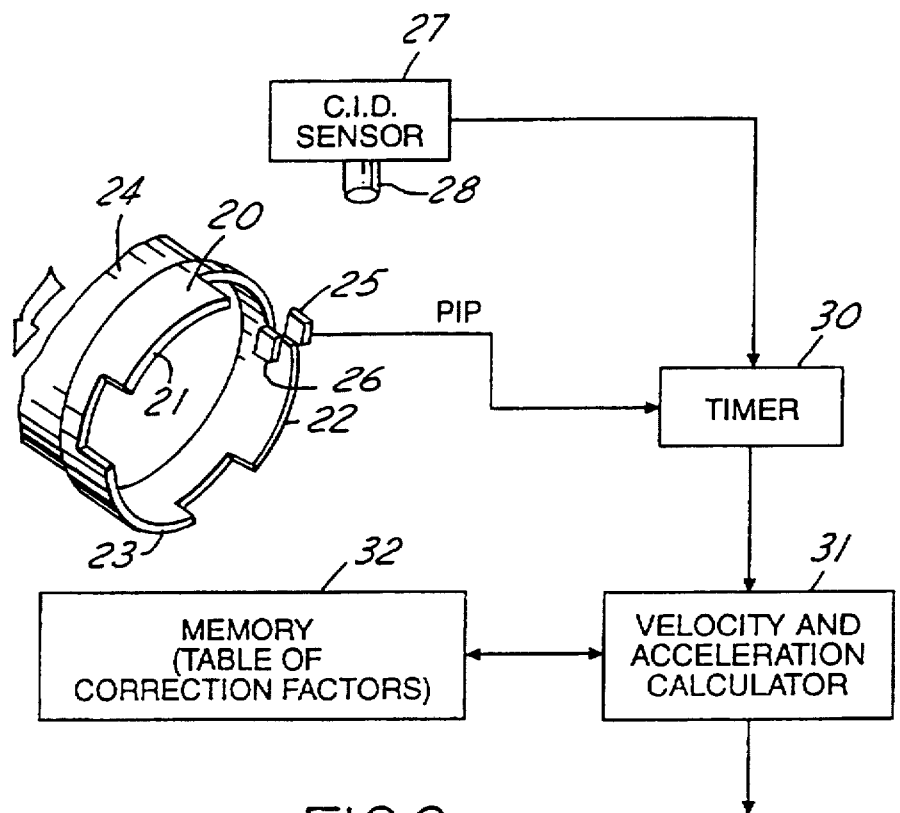
FIG. 2 is a schematic and block diagram showing measuring and calculating apparatus according to the present invention.

As described in the patents mentioned above, crankshaft-based misfire detectors have advantageously employed measured rotation intervals occurring at a frequency of about once per cylinder firing rather than attempting to measure instantaneous values as shown in FIG. 1. FIG. 2 shows an apparatus for measuring velocity and obtaining corrected acceleration values according to the present invention. An engine rotation position sensing system includes a rotor 20 including vanes 21, 22, and 23 which rotate with a crankshaft 24 (a 3-vane rotor from a 6-cylinder engine is shown in this example). Vanes 21–23 pass between a hall-effect sensor 25 and a permanent magnet 26 to generate a profile ignition pulse (PIP) signal as crankshaft 24 rotates. Vanes 21–23 are arranged to generate a rising edge in the PIP signal at a predetermined position in relation to top dead center of each respective cylinder. The PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 27 is connected to a camshaft 28 for identifying which of the two cylinders is actually on its power stroke. Camshaft 28 rotates once for every two rotations of crankshaft 24. The resulting CID signal is preferably generated having a rising edge corresponding to the power stroke of cylinder No. 1. A timer 30 receives the PIP signal and the CID signal and measures elapsed time between predetermined engine position locations as determined by the PIP and CID signals. The elapsed time $\Delta T_i$ for each velocity measuring interval i is output from timer 30 to a velocity and acceleration calculator 31.

In a preferred embodiment, timer 30 and velocity and acceleration calculator 31 are implemented as part of a microcontroller with an associated memory 32 for storing correction factors, other data, and software instructions.

Figure 3:
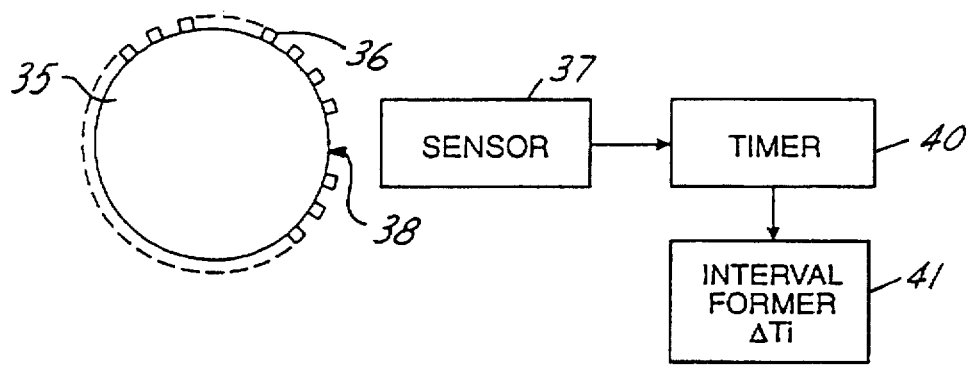
FIG. 3 shows an alternative embodiment for measuring apparatus.

An alternative embodiment of position sensing apparatus is shown in FIG. 3. A multi-toothed wheel 35 is mounted on an engine for rotation with the crankshaft. A plurality of teeth 36 are disposed along the periphery of wheel 35 at a predetermined angular spacing. Teeth 36 are preferably comprised of a metal or other magnetically permeable material. A variable reluctance sensor 37 is disposed in a fixed location closely spaced to teeth 36 for sensing the passage of teeth past sensor 37. A missing tooth location 38 is provided on wheel 35 to establish an absolute location reference, e.g. at 90° before top dead center of cylinder No. 1. A CID signal (not shown) would also be utilized to differentiate between the two halves of the engine cycle. CID sensors other than a camshaft sensor could alternatively be utilized to resolve the ambiguity between the power stroke and the intake stroke, such as sensors responsive to ignition coil current or voltage.

Sensor 37 is connected to a timer 40 and interval former 41 to produce rotation intervals $\Delta T_i$.

Multi-toothed wheel 35 shown in FIG. 3 could be mounted either at the front of an engine or at the rear near the flywheel. In fact, the flywheel itself can be used as a multi-toothed wheel since the periphery of a flywheel includes gear teeth for meshing with a starter motor. Sensor 37 can be mounted either at the front or rear of the engine depending upon the location of multi-toothed wheel 35. Although mounting of the sensor near the flywheel or rear portion of the crankshaft potentially provides better performance for misfire detection, a mounting location is usually selected at the other end of the crankshaft for reasons of cost and convenience.

Figure 4:
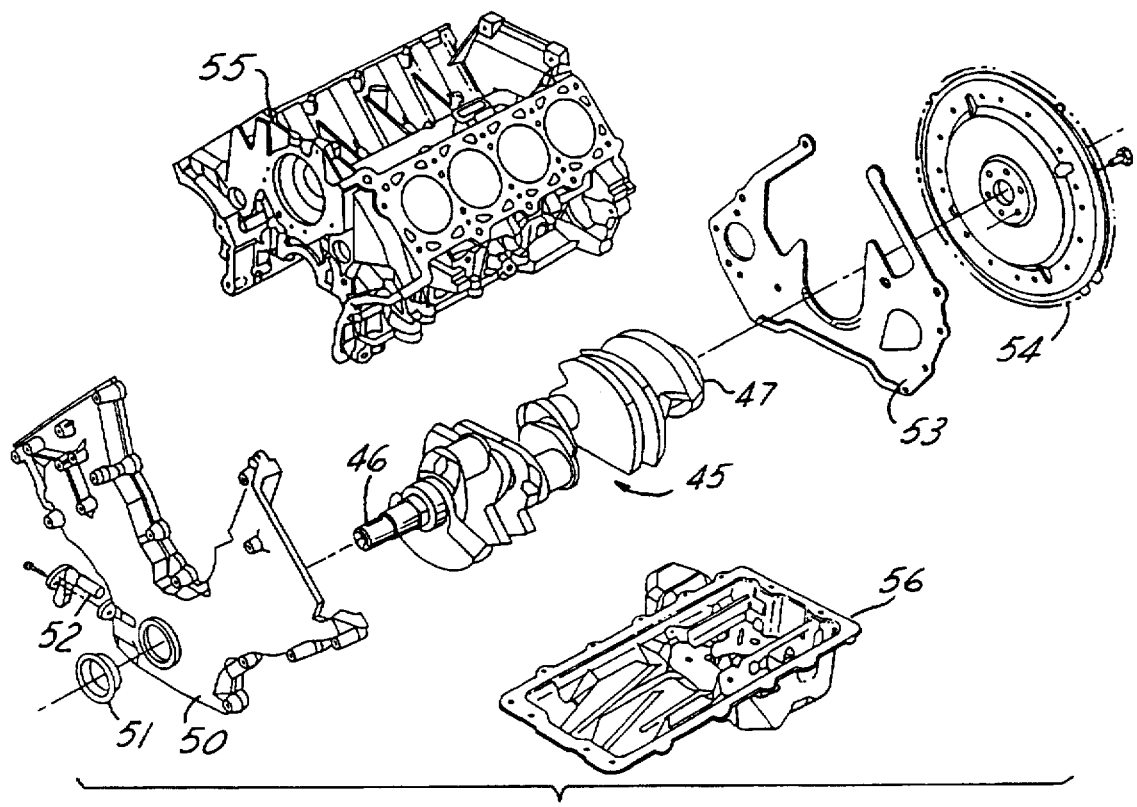
FIG. 4 is an exploded perspective view of portions of an engine including a crankshaft.

FIG. 4 shows a crankshaft 45 having a front end 46 and a back end 47. Front end 46 passes through a front engine plate 50 and has a toothed wheel 51 mounted thereto. A variable reluctance sensor 52 is mounted to front plate 50 for detecting rotation of toothed wheel 51. Back end 47 of crankshaft 45 passes through a rear engine plate 53 to a flywheel 54 that is mounted to back end 47. Crankshaft 45 is further enclosed within the engine which further includes a cylinder block assembly 55 and an oil pan assembly 56, for example.

Crankshaft 45 exhibits greater inertia at its rear end 47 due to the attachment of the massive flywheel 54. In contrast, the front end 46 of crankshaft 45 exhibits less inertia so that torsional oscillations are magnified at the front crankshaft section relative to the rear section of the crankshaft near the flywheel. Furthermore, the torsional vibrations are less periodic (i.e., exhibit a greater range of frequency) than oscillations at the flywheel.

Any torsional oscillations at the front of crankshaft 45 that are contained in data collected using crankshaft sensor 52 (i.e., at the front section of the crankshaft) can be alleviated using the correction factors disclosed in copending application Ser. No. 08/417,357 now U.S. Pat. No. 5,531,108. Even though the signal-to-noise ratio for accelerations as measured at the front of the engine are significantly improved, misfire detection capability may still be inadequate for difficult conditions such as simultaneous high engine speed and low engine load. Better misfire detection capability is obtained overall using a crankshaft position sensor mounted at the flywheel, although flywheel acceleration measurements still benefit from using the torsional correction factors provided in the copending application.

As described in copending application Ser. No. 08/417,361, a misfire detection capability similar to what would be obtained from crankshaft position measurements at the flywheel can be achieved while only requiring actual measurements to be made at the front of the crankshaft by employing a dynamic transformation that maps front-of-engine acceleration measurements to rear-of-engine accelerations. The transformation is a prediction of flywheel motion based on measurements taken at the front of the crankshaft. The relationship between these two quantities is nonlinear and therefore a nonlinear transform such as a neural network is used.

The present invention provides improved techniques wherein: (1) system models are derived in a simplified manner; (2) system models may be derived incorporating any system knowledge that is possessed concerning the system; (3) compact system models are produced which can be implemented on-board a vehicle with a minimum of computing power; and (4) the complexity of the system representation can be selected to appropriately trade-off between modeling accuracy and computational efficiency. As an end result of the invention, an improved misfire detector models and compensates for torsional fluctuations while producing an optimum threshold for misfire detection. A technique called Non-linear AutoRegressive Moving Average with exogenous inputs (NARMAX) is preferably used for model generation.

Figure 5:
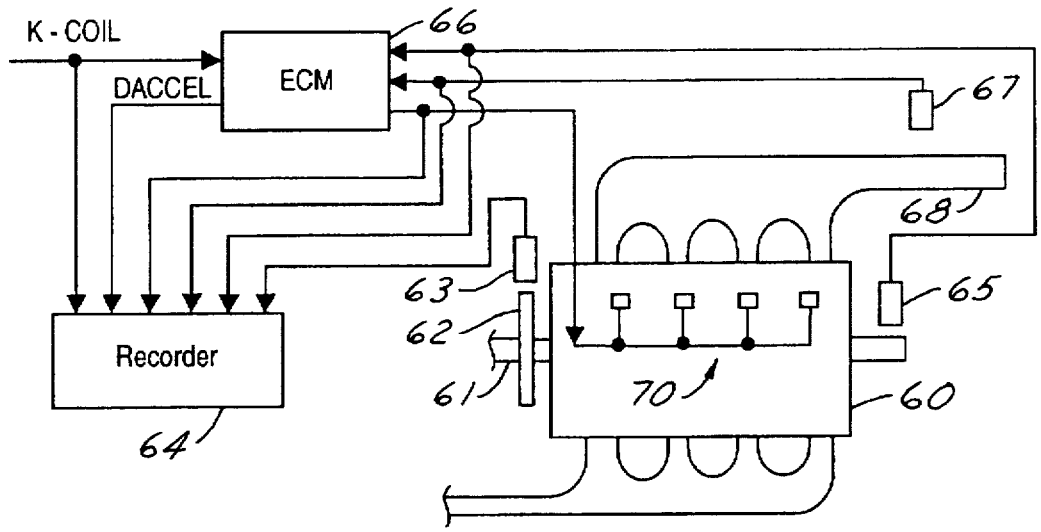
FIG. 5 shows and engine system and sensors configured for collecting data characterizing engine performance under a variety of operating conditions.

Specifically, the present invention uses data collection as shown in FIG. 5. An engine 60 includes a crankshaft 61 projecting from either end of engine 60 and having a flywheel 62 mounted at the rear end thereof. A flywheel position sensor 63 is mounted in close proximity to flywheel 62 for providing flywheel position pulses to a data recorder 64 (these position pulses may first be processed to obtain crankshaft rotation intervals as described in the previously mentioned patents). A crankshaft position sensor 65 is mounted in close proximity to the front end of crankshaft 61 and provides position pulses to an engine control module (ECM) 66. Crankshaft position sensor 65 may be of the type shown in FIG. 2 or FIG. 3, for example.

Additional devices characterizing engine operating conditions include a mass air flow sensor 67 mounted in proximity to an engine air intake 68. A mass air flow signal from sensor 67 is also input to recorder 64. Likewise, signals to or from ECM 66 are recorded in recorder 64 such as fuel pulse width as provided to a plurality of fuel injectors 70, engine acceleration values calculated in ECM 66 such as deviant acceleration (DACCEL) and a K-COIL signal identifying the intentional introduction of misfires by inhibiting ignition coil energizing signals. Engine 60 is operated over a wide range of speeds and loads on a dynamometer and the corresponding sensor and ECM signals are recorded in recorder 64 for various patterns of intentionally introduced misfire as determined by the K-COIL signal.

Figure 6:
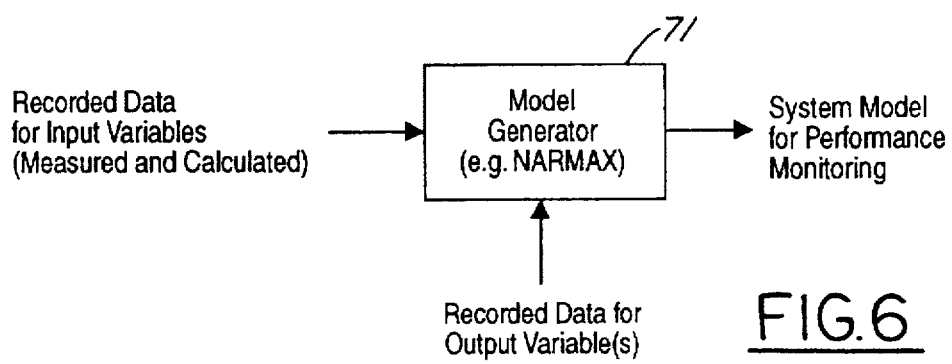
FIG. 6 shows the model generation process used to create a model suitable to monitor engine performance using a reduced number of sensors.

FIG. 6 shows a technique for generating a system model for monitoring performance of a system, such as an internal combustion engine. Recorded data for input variables (including measured and calculated variables) are input to a model generator 71, such as a NARMAX method. Recorded data for output variables are also input to model generator 71. As is known in the art, model generator 71 trains upon the recorded data in order to assume a configuration in which it can predict values for the output variables based on the input variables presented during training, resulting in a system model for performance monitoring. Thus, the final model can be used as a substitute for actually measuring the output variables, thereby allowing deployment of production engines with fewer on-board sensors. The NARMAX method in particular is described in detail by Leontaritis and Billings, *Inout-Output Parametric Model for Non-linear Systems*, INT. J. CONTROL, 1985, Vol. 41, No. 2, pp. 303–328 and 329–324. An application of NARMAX modeling in engine control systems is described by Luh and Rizzoni, *Identification of a Nonlinear MIMO Internal Combustion Engine Model*, DSC-Vol. 54/DE-Vol. 76, Transportation Systems, ASME, 1994, pages 141–174.

In a preferred embodiment, the data collected in FIG. 5 is presented to model generator 71 wherein the output variable is selected to be comprised of velocity measurements obtained using the flywheel sensor. Thus, a system model is produced which predicts the rotational motion measured at the flywheel based upon crankshaft rotation measured at the front end of the crankshaft (and whatever other engine operating conditions that may become relevant as are revealed in the NARMAX results). Thus, a NARMAX method is applied to the recorded data which performs curve fitting of a plurality of functions in order to best predict the flywheel values.

Figure 7:
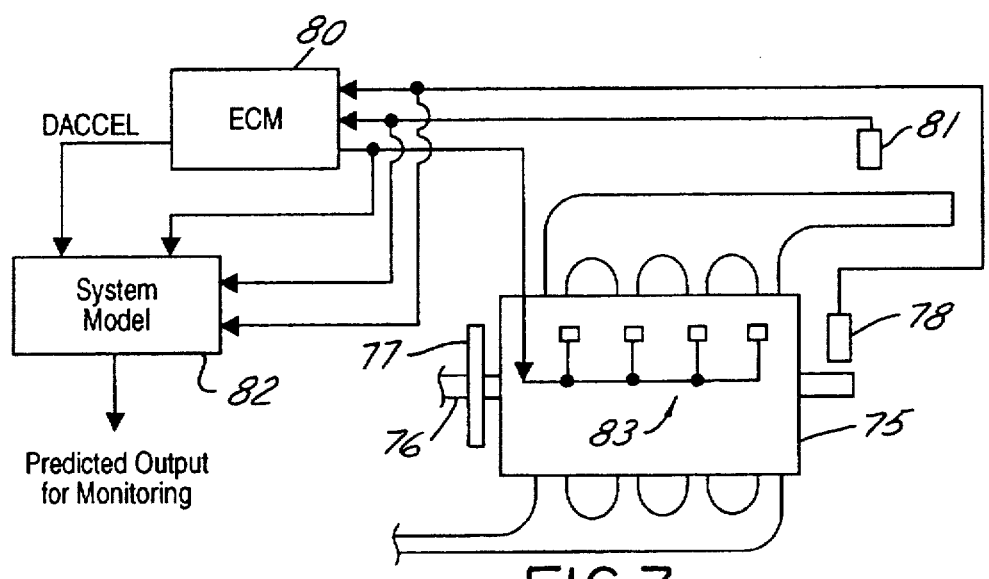
FIG. 7 shows an engine system with performance monitoring using a model generated by the process of FIG. 6.

FIG. 7 illustrates on-board deployment of a system model in production vehicles for performing misfire detection without requiring position measurements at the flywheel. Production engine 75 includes a crankshaft 76 having a flywheel 77 mounted thereon. Crankshaft rotation is sensed by a crankshaft position sensor 78 which provides an output signal to an ECM 80. A mass airflow sensor 81 provides a mass airflow signal to ECM 80. Both the crankshaft position signal and the mass air flow signal are provided to a system model 82. ECM 80 calculates a fuel pulse width signal which is provided to injectors 83 in engine 75 and to system model 82. DACCEL values (and/or rotation timings or velocities for selected event times) are calculated in ECM 80 and are provided system model 82. System model 82 generates a predicted flywheel acceleration DACCEL value that would be measured at the flywheel. This predicted rear DACCEL signal comprises the output of the system model for monitoring the occurrence of misfire.

Figure 8:
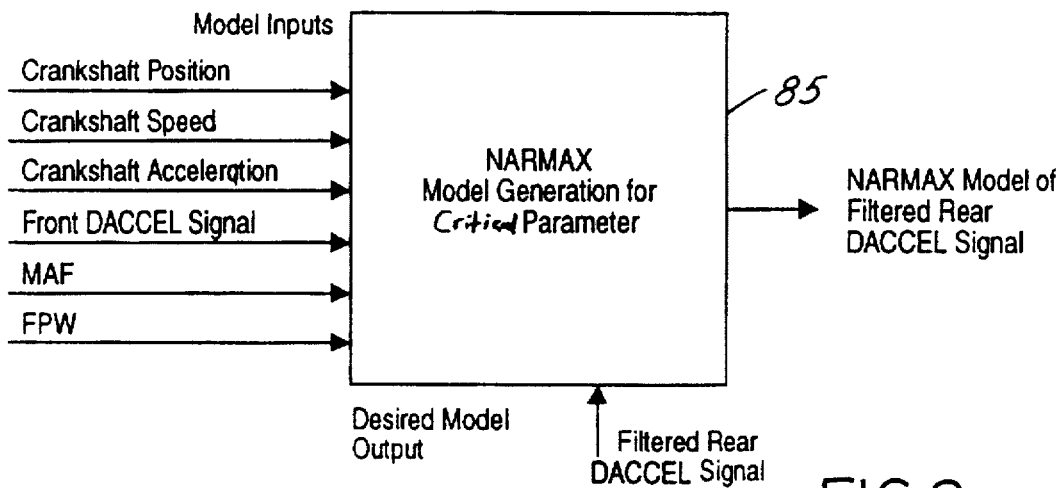
FIG. 8 shows model generation for predicting rear crankshaft acceleration.

A preferred embodiment for training a model of a rear DACCEL signal is shown in FIG. 8. A NARMAX model generator 85 receives model inputs of crankshaft position, crankshaft speed, crankshaft acceleration, front DACCEL signal, mass air flow signal, and fuel pulse width signal. The desired model output signal supplied to model generator 85 is a filtered rear DACCEL signal that was likewise obtained as training data from a test engine. In order to improve accuracy of misfire detection, the rear DACCEL signal is filtered in order better approximate fully damped crankshaft position without any torsional oscillations. Thus, even though crankshaft position as measured at the flywheel has a reduced influence from torsional oscillations, the small remaining torsional oscillations can be removed by processing the existing rear DACCEL signal in accordance with the previously mentioned U.S. Pat. No. 5,531,108, for example. In particular, torsional oscillations as seen at the rear flywheel are subtracted according to measured values for the oscillations which are determined during steady state operation of the test engine. Alternatively, a simpler filter may be implemented by using the measured rear DACCEL signal upon occurrence of a misfire but a value of zero for the rear DACCEL value when there is no misfire. In any case, model generator 85 produces a NARMAX model of filtered rear DACCEL signal for use in on-board diagnostics.

Figure 9:
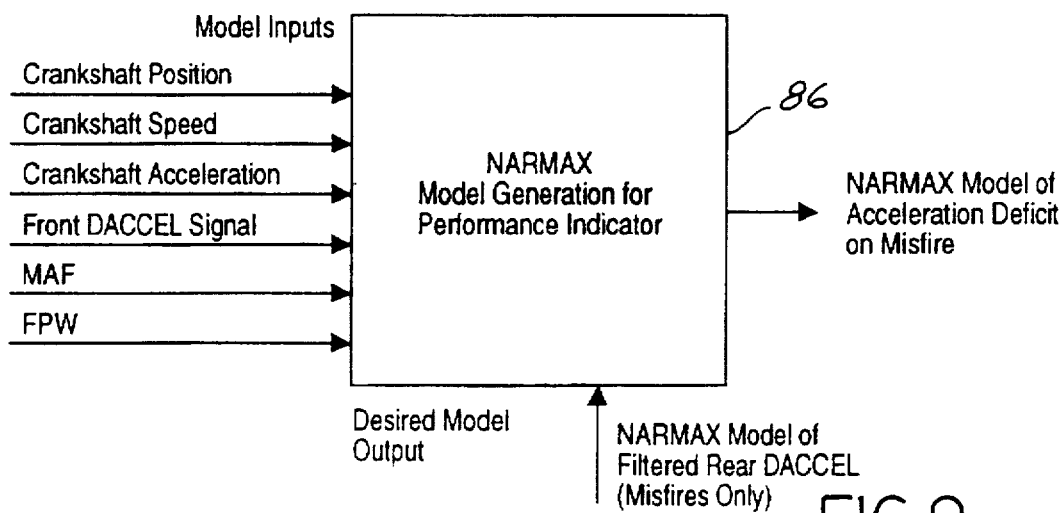
FIG. 9 shows model generation for predicting an acceleration deficit that would be seen at the rear crankshaft in the event that a misfire had actually occurred.

The present invention obtains further improvements in misfire detection by utilizing a second model generator to produce a model of acceleration deficit during the occurrence of misfire (i.e., what DACCEL value would be expected under current conditions if a misfire were actually to occur). Thus, as shown in FIG. 9, a NARMAX model generator 86 receives model inputs of crankshaft position, crankshaft speed, crankshaft acceleration, front DACCEL signal, mass air flow signal, and fuel pulse width signal. The desired model output that is provided to model generator 86 consists of the output of the NARMAX model of filtered rear DACCEL signal as generated in FIG. 8, but including only those values corresponding to event times with the occurrence of misfire (i.e., only those data points are taken from the recorded data that correspond to a value of K-COIL indicating an induced misfire, e.g., K-COIL=1). Thus, an optimum threshold is produced for misfire detection.

More generally, what happens in this invention is that model generator 85 in FIG. 8 generates a model for a critical parameter used to track a particular condition and then model generator 86 in FIG. 9 produces a model for creating a threshold useful as a performance indicator of the critical parameter. Comparison of the model outputs indicates the level of performance.

In the preferred embodiment involving misfire detection, model generator 86 produces a NARMAX model for generating an acceleration deficit value that would be expected to be seen if a misfire occurs assuming: (1) that respective engine operating conditions are present as determined at a selected event time (i.e., a particular cylinder firing rotation interval), and (2) that an individual misfire has occurred in a respected cylinder of the engine at the selected event time. The value that would be predicted to be present in the event that a misfire has occurred is compared to the actual predicted value of DACCEL from the first model. The result of the comparison produces a misfire indication.

Figure 10:
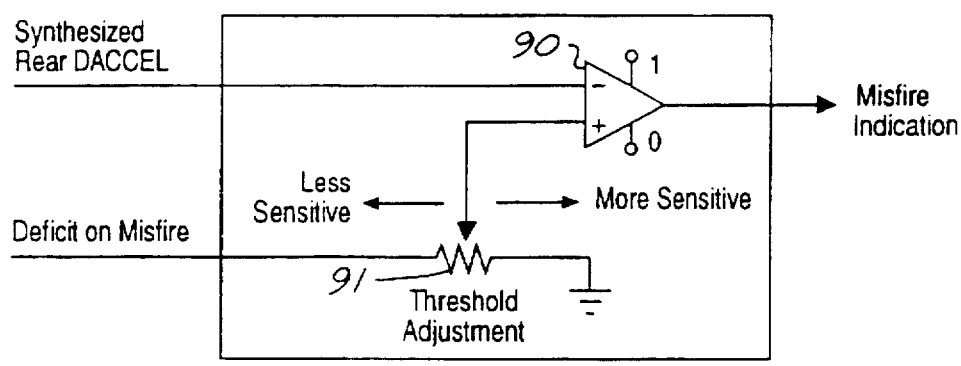
FIG. 10 is a schematic diagram of a comparison circuit to determined misfire based on the outputs of the models generated in FIGS. 8 and 9.

FIG. 10 shows a circuit for performing a comparison to produce a misfire indication. The synthesized rear DACCEL signal as produced by the system model from first model generator 85 is coupled to the inverting input of a comparator 90. A predicted acceleration deficit on misfire is coupled to one input of a threshold adjustment potentiometer 91. The output tap of potentiometer 91 is coupled to the noninverting input of comparator 90. The output of potentiometer 91 can be adjusted to provide a less sensitive or a more sensitive misfire indication, as shown. Comparator 90 receives a nominal supply voltage of +1 volt and is connected to a ground reference zero volts in order to produce a misfire indication having a voltage level of either +1 or 0 volts.

Threshold adjustment potentiometer 91 scales the acceleration deficit on misfire value by a factor between 0 and 1. A preferred value of 0.5 puts the threshold halfway between 0 (representing a normal firing which would produce an extremely sensitive misfire detector) and 1 (representing the loss in acceleration that would accompany a misfire, which would produce a highly insensitive misfire detector).

Figure 11:
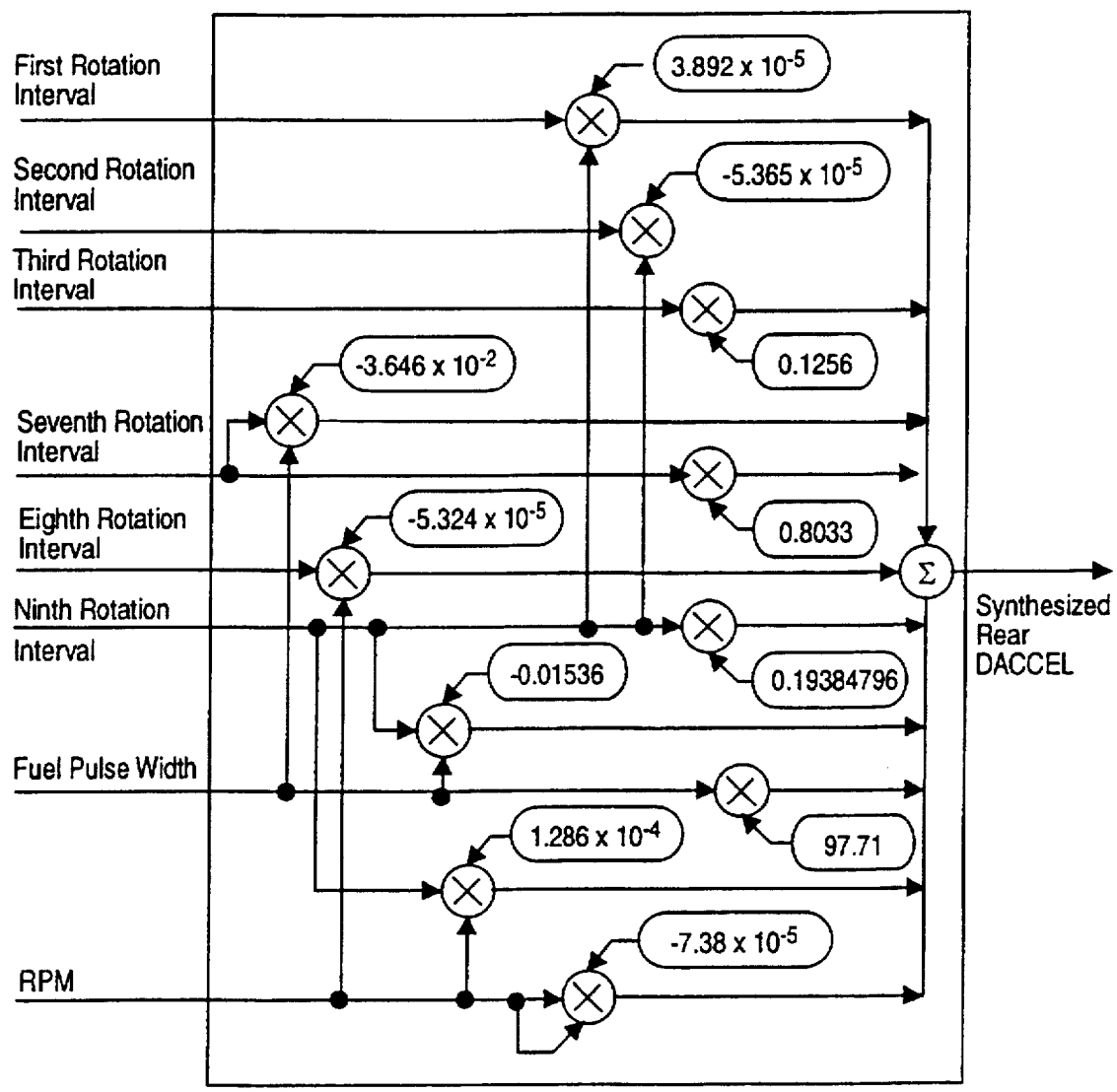
FIG. 11 is one preferred implementation of a model generated in accordance with FIG. 8.

FIG. 11 shows a NARMAX generated model for producing a synthesized rear DACCEL signal based on test data derived from an actual test engine. Thus, NARMAX curve fitting techniques produced a model wherein first, second, third, seventh, eighth, and ninth rotation intervals together with fuel pulse width and engine RPM's are input to a computationally simple formula using multiplication and addition. Likewise, a model for estimated acceleration deficit was derived as shown in FIG. 12 which relies only on fuel pulse width as an input signal.

Figure 12:
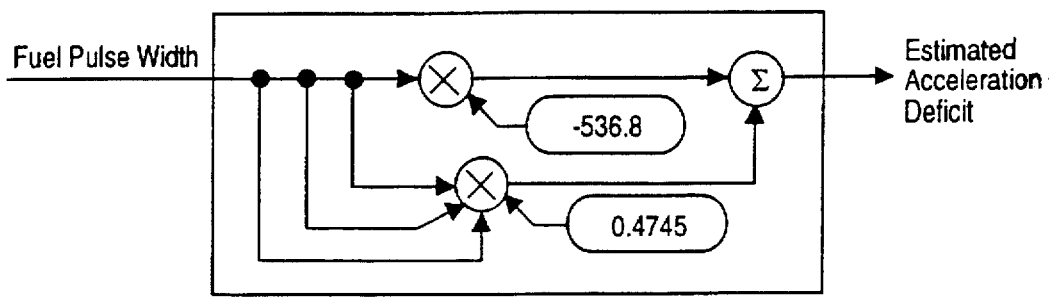
FIG. 12 is one preferred implementation of a model generated in accordance with FIG. 9.

Rather than specific hardware circuits as shown in FIGS. 11 and 12, the present invention could be implemented using computational software either in a stand alone microprocessor unit or within the engine control module if sufficient computing capacity is available.

What is claimed is:

1. A method of deriving a predictive model for use in a misfire detector for an internal combustion engine having a nonrigid crankshaft, said predictive model predicting motion of a remote section of said crankshaft which is relatively damped with respect to torsional oscillations, said predictive model being based on motion sensed at a non-remote section of said crankshaft which is relative undamped with respect to torsional oscillations, said method comprising the steps of:

operating a test engine with and without induced misfires over a range of speeds and loads;

measuring engine operating conditions over said range of speeds and loads, said engine operating conditions including crankshaft rotation intervals measured at both said non-remote section and said remote section of said crankshaft;

determining deviant acceleration values at said remote and non-remote crankshaft sections in response to said crankshaft rotation intervals; and curve-fitting said measured engine operating conditions using nonlinear autoregressive moving average with exogenous inputs (NARMAX) techniques to obtain a computational formula for said predictive model, wherein said deviant acceleration values determined for said non-remote section of said crankshaft are related to said deviant acceleration values determined for said remote section of said crankshaft.

2. The method of claim 1 further comprising the step of filtering said deviant acceleration values for said remote crankshaft section prior to said curve-fitting step to reduce torsional oscillations in said deviant acceleration values.

3. The method of claim 2 wherein said filtering is comprised of subtracting torsional oscillation values measured during steady state operation of said test engine.

4. The method of claim 2 wherein said filtering is comprised of assigning a value of zero to said deviant acceleration values when no misfire occurred.

5. The method of claim 1 wherein said engine operating conditions which are measured and input to said NARMAX techniques for curve-fitting further include fuel pulse width of fuel supplied to said engine.

6. The method of claim 1 wherein said engine operating conditions which are measured and input to said NARMAX techniques for curve-fitting further include mass air flow into said engine.

* * * * *